United States Patent
Kim et al.

(10) Patent No.: US 10,343,515 B2
(45) Date of Patent: Jul. 9, 2019

(54) FUEL FILLING APPARATUS AND METHOD FOR BI-FUEL VEHICLE

(71) Applicant: Hyundai Motor Company, Seoul (KR)

(72) Inventors: Chang Han Kim, Gwangju (KR); Jong Ki Kim, Gyeonggi-do (KR); Jae Hwa Park, Gyeonggi-do (KR); Jae Min Lee, Chungcheongnam-do (KR)

(73) Assignee: Hyundai Motor Company, Seoul (KR)

(*) Notice: Subject to any disclaimer, the term of this patent is extended or adjusted under 35 U.S.C. 154(b) by 86 days.

(21) Appl. No.: 15/213,742

(22) Filed: Jul. 19, 2016

(65) Prior Publication Data

US 2017/0120745 A1    May 4, 2017

(30) Foreign Application Priority Data

Oct. 30, 2015    (KR) .................. 10-2015-0151728

(51) Int. Cl.
*B67D 7/04*    (2010.01)
*B67D 7/32*    (2010.01)
(Continued)

(52) U.S. Cl.
CPC .. *B60K 15/03519* (2013.01); *B60K 15/03006* (2013.01); *B60K 15/04* (2013.01); *B67D 7/04* (2013.01); *B67D 7/3281* (2013.01); *F02D 19/0647* (2013.01); *F02D 19/0665* (2013.01); *F02M 21/0212* (2013.01); *F02M 21/0224* (2013.01); *F02M 25/08* (2013.01);
(Continued)

(58) Field of Classification Search
CPC ........ B60K 15/03519; B60K 15/03006; B60K 15/04; B67D 7/04; B67D 7/3281; F02D 19/0647; F02D 19/0665; F02M 21/0212; F02M 21/0224; F02M 25/08; F02M 25/089; F02M 37/0064
USPC ........................................... 141/59
See application file for complete search history.

(56) References Cited

U.S. PATENT DOCUMENTS 5,184,585 A * 2/1993 Wilson .................. F02N 19/001
                                                    123/179.21
6,035,837 A * 3/2000 Cohen ................. F02D 19/0628
                                                    123/27 GE
(Continued)

FOREIGN PATENT DOCUMENTS

JP    2004-346815 A    12/2004
JP    2007-309375 A    11/2007
(Continued)

*Primary Examiner* — Timothy L Maust
*Assistant Examiner* — James R Hakomaki
(74) *Attorney, Agent, or Firm* — Mintz Levin Cohn Ferris Glovsky and Popeo, P.C.; Peter F. Corless

(57) ABSTRACT

A fuel filling apparatus and method for a bi-fuel vehicle using both gasoline and liquefied petroleum gas (LPG) as fuel are provided to an LPG fuel tank. The fuel filling apparatus and method are capable of temporarily burning a portion of LPG fuel after collecting a fuel portion, using a gasoline fuel tank and a canister, when the internal pressure of the LPG fuel tank in the bi-fuel vehicle is equal to or greater than an LPG filling pressure of a filling gun. Additionally, the internal pressure of the LPG fuel tank is decreased to a level below the LPG filling pressure of the filling gun, thereby achieving smoother LPG fuel filling of the LPG fuel tank by the filling gun.

8 Claims, 2 Drawing Sheets

(51) Int. Cl.
*B60K 15/03* (2006.01)
*B60K 15/04* (2006.01)
*F02D 19/06* (2006.01)
*F02M 21/02* (2006.01)
*F02M 25/08* (2006.01)
*F02M 37/00* (2006.01)
*B60K 15/035* (2006.01)

(52) U.S. Cl.
CPC ...... *F02M 25/089* (2013.01); *F02M 37/0064* (2013.01); *B60K 2015/0319* (2013.01); *B60K 2015/0321* (2013.01); *B60K 2015/03026* (2013.01); *B60K 2015/03203* (2013.01); *B60K 2015/03302* (2013.01); *B60K 2015/03355* (2013.01); *B60K 2015/03576* (2013.01); *B60K 2015/03585* (2013.01); *B67D 2007/329* (2013.01); *Y02T 10/32* (2013.01); *Y02T 10/36* (2013.01)

(56) References Cited

U.S. PATENT DOCUMENTS

| | | | | |
|---|---|---|---|---|
| 7,185,938 B2* | 3/2007 | Beck | ............ | B60K 15/04 |
| | | | | 292/207 |
| 8,516,997 B2* | 8/2013 | Pursifull | ............ | F02D 19/0605 |
| | | | | 123/516 |
| 8,677,690 B2* | 3/2014 | Lee | ............ | B60K 15/05 |
| | | | | 296/97.22 |
| 9,567,918 B2* | 2/2017 | Kjar | ............ | F02D 19/0615 |
| 2003/0226349 A1* | 12/2003 | Klenk | ............ | F01N 3/2033 |
| | | | | 60/274 |
| 2005/0145294 A1* | 7/2005 | Fink, Jr. | ............ | B67D 7/0476 |
| | | | | 141/82 |
| 2008/0105329 A1* | 5/2008 | Benjey | ............ | B67D 7/0476 |
| | | | | 141/59 |
| 2009/0229674 A1* | 9/2009 | Revink | ............ | B60K 15/03519 |
| | | | | 137/197 |
| 2010/0024789 A1* | 2/2010 | Lippa | ............ | F02D 19/0684 |
| | | | | 123/672 |
| 2011/0011369 A1* | 1/2011 | Jaasma | ............ | F02D 19/0647 |
| | | | | 123/304 |
| 2011/0168132 A1* | 7/2011 | Pursifull | ............ | F02M 43/00 |
| | | | | 123/446 |
| 2011/0168133 A1* | 7/2011 | Pursifull | ............ | F02M 37/0064 |
| | | | | 123/495 |
| 2011/0214644 A1* | 9/2011 | Barta | ............ | F02M 37/04 |
| | | | | 123/512 |
| 2011/0290203 A1* | 12/2011 | Pursifull | ............ | F02D 19/0605 |
| | | | | 123/41.08 |
| 2012/0060935 A1* | 3/2012 | Carter | ............ | F02M 21/0212 |
| | | | | 137/14 |
| 2012/0152210 A1* | 6/2012 | Reddy | ............ | F02M 25/089 |
| | | | | 123/520 |
| 2012/0312280 A1* | 12/2012 | Jaasma | ............ | F02D 19/0647 |
| | | | | 123/456 |
| 2013/0146145 A1* | 6/2013 | Song | ............ | F17C 5/007 |
| | | | | 137/1 |
| 2013/0255636 A1* | 10/2013 | Pursifull | ............ | F02D 19/0613 |
| | | | | 123/446 |
| 2014/0084620 A1* | 3/2014 | Frommann | ............ | B60K 15/05 |
| | | | | 296/97.22 |
| 2014/0224209 A1* | 8/2014 | Pursifull | ............ | F02M 63/0001 |
| | | | | 123/294 |
| 2014/0245995 A1* | 9/2014 | Deliyski | ............ | F02M 69/50 |
| | | | | 123/456 |
| 2014/0345575 A1* | 11/2014 | Peters | ............ | F02M 25/0836 |
| | | | | 123/520 |
| 2015/0047590 A1* | 2/2015 | Kim | ............ | F02D 19/025 |
| | | | | 123/1 A |
| 2015/0192064 A1* | 7/2015 | Criel | ............ | B60R 21/0136 |
| | | | | 123/529 |
| 2017/0067415 A1* | 3/2017 | Cai | ............ | F02M 25/0854 |
| 2018/0135994 A1* | 5/2018 | Stahl | ............ | F17C 9/02 |

FOREIGN PATENT DOCUMENTS

| | | |
|---|---|---|
| KR | 2007-0044685 A | 4/2007 |
| KR | 2007-0044885 A | 5/2007 |
| KR | 10-2009-0032794 A | 4/2009 |
| KR | 2009-0040787 A | 4/2009 |
| KR | 2010-0128319 A | 12/2010 |
| KR | 10-2013-0080373 A | 7/2013 |
| KR | 10-1438967 B1 | 9/2014 |

\* cited by examiner

FUEL FILLING APPARATUS AND METHOD FOR BI-FUEL VEHICLE

CROSS-REFERENCE TO RELATED APPLICATION

This application claims under 35 U.S.C. § 119(a) the benefit of priority to Korean Patent Application No. 10-2015-0151728 filed on Oct. 30, 2015, the entire contents of which are incorporated herein by reference.

BACKGROUND

(a) Technical Field

The present disclosure relates to a fuel filling apparatus and method for a bi-fuel vehicle, and more particularly to a fuel filling apparatus and method for a bi-fuel vehicle using both gasoline and liquefied petroleum gas (LPG) as a fuel to more easily fill an LPG fuel tank with LPG.

(b) Background Art

Generally, in a bi-fuel vehicle using both gasoline and liquefied petroleum gas (LPG) as a fuel, a system for supplying a gasoline fuel to an engine and a system for supplying LPG fuel to the engine are configured to be separate from each other and, as such, gasoline fuel filling and LPG fuel filling are performed in a separate manner.

As shown in FIG. 1, LPG fuel filling in the bi-fuel vehicle is performed by driving a filling pump installed at a filling station, transferring LPG fuel from an LPG storage tank to a filling gun based on the driving of the filling pump, and filling an LPG fuel tank of the vehicle with LPG fuel by an LPG filling pressure of the filling gun. In summer or during warmer temperatures, however, there may be a problem in that LPG fuel filling is impossible when the internal pressure of the LPG fuel tank in the vehicle increases above an LPG filling pressure due to high ambient temperature.

For example, under the condition that ambient temperature in summer is about 40° C. or above, the internal temperature of the LPG fuel tank in the vehicle (e.g., about 16.5 bar) may be increased above the LPG filling pressure of the filling gun (e.g., 16.3 bar=8.3 bar (the internal pressure of the LPG storage tank at the filling station)+8.0 bar (the LPG pumping pressure based on the driving of the filling pump)). As a result, there may be a problem in that the LPG fuel tank is not able be filled with LPG fuel through the filling gun.

SUMMARY

The present invention provides a fuel filling apparatus and method for a bi-fuel vehicle capable of temporarily burning a portion of liquefied petroleum gas (LPG) fuel after collecting the fuel portion, using a gasoline fuel tank and a canister, when the internal pressure of an LPG fuel tank in the bi-fuel vehicle is greater than an LPG filling pressure of a filling gun, to decrease the internal pressure of the LPG fuel tank to a level below the LPG filling pressure of the filling gun, thereby achieving smoother LPG fuel filling of the LPG fuel tank using the filling gun.

In one aspect, the present invention provides a fuel filling apparatus for a bi-fuel vehicle that may include a solenoid valve mounted to a liquefied petroleum gas (LPG) fuel tank in the bi-fuel vehicle, wherein the valve is opened or closed, a venting line connected to an outlet of the solenoid valve, a pressure sensor configured to sense a pressure of the fuel tank, a controller configured to operate the solenoid valve to be temporarily opened when the fuel tank pressure sensed by the pressure sensor is equal to or higher than a filling pressure of a filling gun, to collect a portion of LPG fuel in the fuel tank, and a collector connected to a trailing end of the venting line, to collect the LPG fuel portion discharged through the solenoid valve, and to supply the collected LPG fuel to an engine, for temporary startup of the engine.

In an exemplary embodiment, the collector may include a check valve mounted to a gasoline fuel tank while being connected to the trailing end of the venting line, a canister for collecting LPG fuel introduced into an upper expansion space of the gasoline fuel tank after passing through the check valve, and then supplying the collected LPG fuel to the engine, and a purge valve mounted to a suction manifold, to guide the LPG fuel supplied from the canister to a combustion chamber of the engine. In another exemplary embodiment, the fuel filling apparatus may further include a motor-driven door mounted to an inlet portion of a filling port connected to the fuel tank via a filling line, the motor-driven door may be opened by the controller when the fuel tank pressure is decreased to a level below the filling pressure of the filling gun.

In addition, the fuel filling apparatus may further include a door opening sensor mounted to the inlet portion of the filling port, to sense an opened state of the motor-driven door. The pressure sensor may be mounted to a regulator configured to regulate a pressure of fuel supplied from the fuel tank to the engine. The fuel filling apparatus may further include a cluster configured to provide a warning regarding standby of fuel filling until the fuel tank pressure is decreased to a level below the filling pressure of the filling gun.

In another aspect, the present invention provides a fuel filling method for a bi-fuel vehicle that may include sensing a pressure of a fuel tank storing liquefied petroleum gas (LPG) fuel, collecting a portion of the LPG fuel in the fuel tank when the fuel tank pressure is equal to or greater than a filling pressure of a filling gun, supplying the collected LPG fuel to an engine, and combusting the supplied LPG fuel based on startup of the engine to regulate the fuel tank pressure to be decreased to a level below the filling pressure of the filling gun, and operating a motor-driven door of a filling port to be opened for filling the fuel tank with LPG fuel when the fuel tank pressure is decreased to a level below the filling pressure of the filling gun.

In an exemplary embodiment, the collecting of a portion of the LPG fuel in the fuel tank may include guiding a portion of the LPG fuel in the fuel tank to an upper expansion space of a gasoline fuel tank, and collecting, in a canister, the LPG fuel present in the upper expansion space of the gasoline fuel tank, for supply of the collected LPG fuel to a combustion chamber of the engine. In addition, the fuel filling method may further include sensing an opened state of the motor-driven door by a door opening sensor mounted to the filling port, to determine a failure of the motor-driven door. The fuel filling method may further include providing a warning regarding standby of fuel filling until the fuel tank pressure is decreased to a level below the filling pressure of the filling gun.

Through the above-described configurations, the present invention provides the following effects.

In accordance with the present invention, when the LPG fuel tank pressure of the bi-vehicle is equal to or greater than the LPG filling pressure of the filling gun due to an excessive increase in ambient temperature for example, in summer, a portion of the LPG fuel in the fuel tank may be guided to the upper expansion space of the gasoline tank, and may be combusted in the engine after being collected by the canister. Accordingly, it may be possible to decrease the fuel tank pressure below the filling pressure of the filling gun and, as such, filling the fuel tank with the LPG fuel using the filling gun may be more smoothly achieved.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
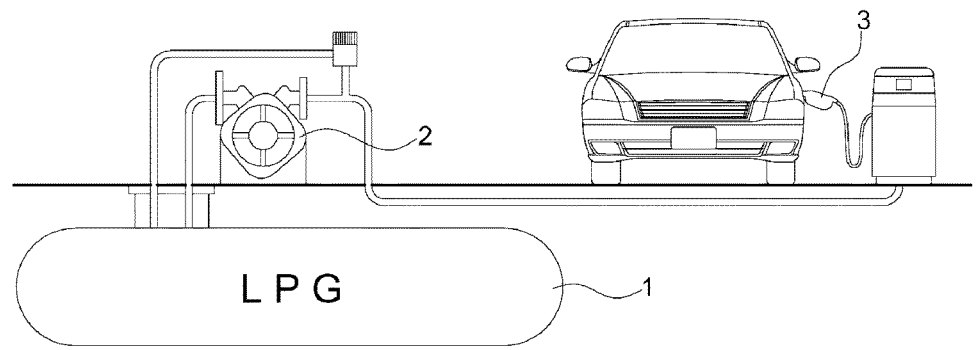
FIG. 1 is a diagram briefly illustrating a procedure of filling a bi-fuel vehicle with liquefied petroleum gas (LPG) fuel according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Figure 2:
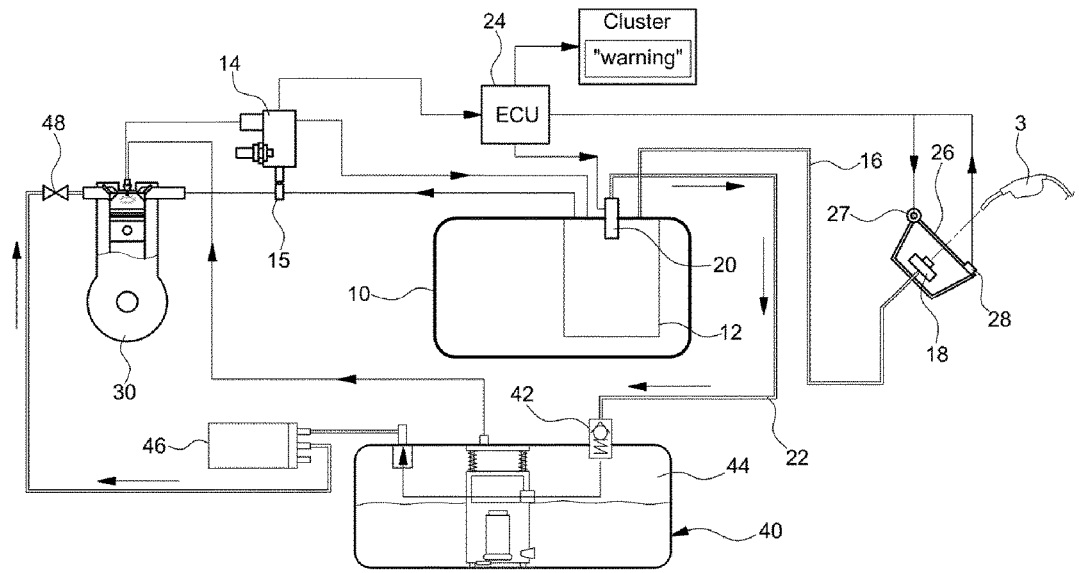
FIG. 2 is a diagram illustrating a configuration of a fuel filling apparatus for a bi-fuel vehicle according to an exemplary embodiment of the present invention.
Figure 3:
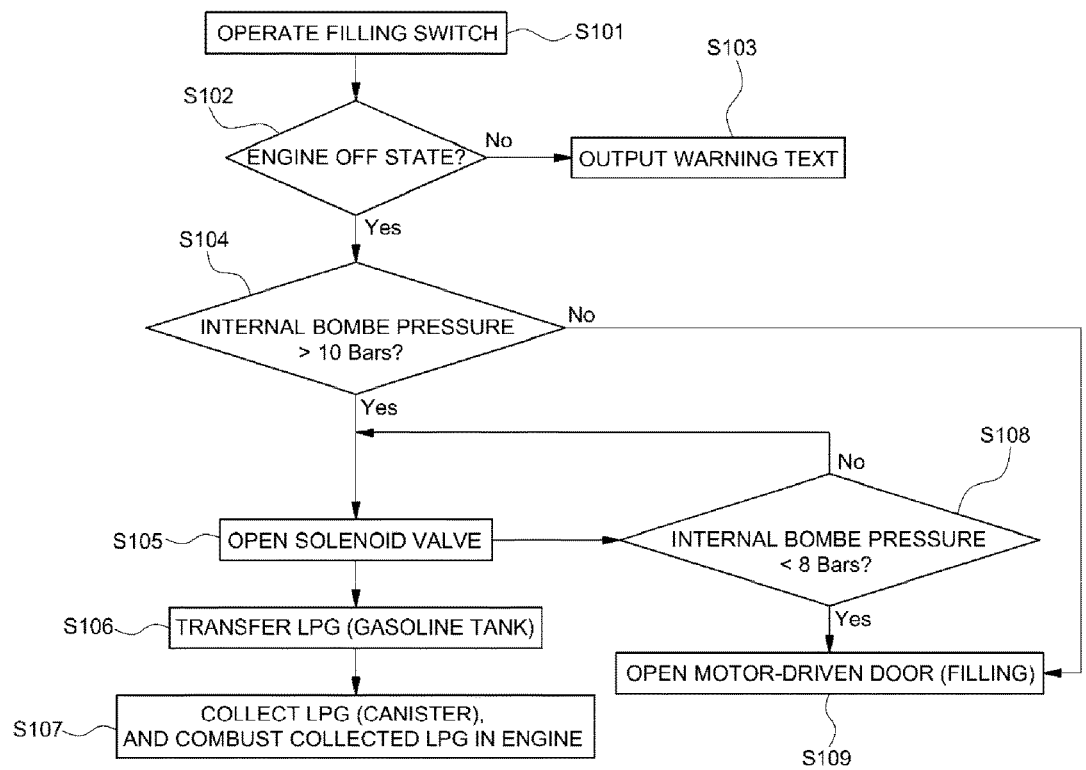
FIG. 3 is a flowchart illustrating a fuel filling method for a bi-fuel vehicle according to an exemplary embodiment of the present invention.

FIGS. 2 and 3 are diagrams illustrating a configuration of a fuel filling apparatus for a bi-fuel vehicle according to an exemplary embodiment of the present invention. In FIGS. 2 and 3, reference numeral "10" designate a fuel tank to be filled with liquefied petroleum gas (LPG) fuel, for storage thereof. A fuel pump 12 configured to supply LPG fuel to an engine 30 may be disposed in the fuel tank 10. A regulator 14 may be mounted at a fuel supply line connecting the fuel tank 10 to the engine 30, to regulate a fuel supply pressure and thus, the fuel supply pressure may have a substantially constant level.

In addition, a filling line 16 may be connected to the fuel tank 10. A filling port 18 may be mounted to an inlet of the filling line 16. A filling gun 3 at a filling station may be inserted into the filling port 18, to execute the filling. In particular, the regulator 14 may include a pressure sensor 15 configured to sense a pressure of the fuel supplied from the fuel tank 10, that is, the internal pressure of the fuel tank 10 (e.g., fuel pressure). In addition, a solenoid valve 20 may be mounted to a fuel outlet of the fuel tank 10 in an openable and closeable manner.

Particularly, the solenoid valve 20 may be mounted at an outlet position of the fuel pump 12 mounted in the fuel tank 10 in an openable and closeable manner (e.g., capable of being opened and closed by operation of the controller). A venting line 22 may be connected to an outlet of the solenoid valve 20. Further, the venting line 22 may be configured to guide a portion of the LPG fuel from the fuel tank 10 to be discharged toward a gasoline fuel tank 40 when the solenoid valve 20 is opened. Additionally, when the fuel tank pressure sensed by the pressure sensor 15 is equal to or greater than the filling pressure of the filling gun (e.g., when the LPG pressure of the fuel tank in the vehicle increases above the LPG filling pressure of the filling gun due to an excessive increase in ambient temperature, for example, in summer) the solenoid valve 20 may be temporarily opened by a controller 24. In particular, the LPG fuel in the fuel tank 10 may be discharged toward a collector via the venting line 22.

In other words, the controller 24 may be configured to receive a sensing signal from the pressure sensor 15, and may be configured to temporarily open the solenoid valve 20, upon determining, based on the sensing signal, that the fuel tank pressure is equal to or greater than the filling pressure of the filling gun. Accordingly, the LPG fuel in the fuel tank 10 may be discharged into the collector via the opened solenoid valve 20 and the venting line 22. The collector may be connected to a trailing end (e.g., free end) of the venting line 22, and may collect a portion of the LPG fuel discharged through the solenoid valve 20, and then supply the collected LPG fuel to the engine, for temporary startup of the engine.

Further, the collector may include a check valve 42 mounted to the gasoline fuel tank 40 while being connected to the trailing end of the venting line 22, and a canister 46 used to collect LPG fuel introduced into an upper expansion space 44 of the gasoline fuel tank 40 after passing through the check valve 42, and then supplying the collected LPG fuel to the engine. The collector may further include a purge valve 48 mounted to a suction manifold, to guide the LPG fuel supplied from the canister 46 to a combustion chamber of the engine.

In accordance with the above-described arrangement, the venting line may be connected between the solenoid valve 20 mounted to the fuel tank 10 and the check valve 42 mounted to the gasoline fuel tank 40. Particularly, a residual expansion space not filled with fuel may be disposed at the upper space of the gasoline fuel tank 40. The LPG fuel introduced into the gasoline fuel tank 40 via the venting line 22 and check valve 42 may temporarily remain in the expansion space 44. In addition, the canister 46, that collects evaporated gasoline or the like, may be connected to the gasoline fuel tank 40. Accordingly, the LPG fuel introduced into the expansion space 44 may be supplied to the engine after being collected in the canister 46.

For reference, the canister 46 may be configured to collect any of evaporated gasoline and LPG gas since both the gasoline and the LPG are compounds of hydrocarbons. Finally, the LPG fuel supplied from the canister 46 may be introduced into the combustion chamber of the engine via the purge valve 48 mounted to the suction manifold, and then may be combusted. Particularly, the controller 24 may be configured to execute the startup of the engine, simultaneously with the supply of the LPG fuel to the engine. For example, an engine control unit (ECU) (not shown) may be configured to execute startup of the engine when the controller 24 transmits an opening control signal for the solenoid valve 20 to the ECU.

As described above, when the fuel tank pressure is equal to or greater than the filling pressure of the filling gun, a portion of the LPG fuel in the fuel tank may be guided to the upper expansion space 44 of the gasoline fuel tank 40, and may be combusted in the engine after being collected by the canister 46. Accordingly, it may be possible to decrease the fuel tank pressure below the filling pressure of the filling gun and, as such, filling of the fuel tank with the LPG fuel using the filling gun may be achieved more smoothly. Meanwhile, a motor-driven door 26 may be mounted to an inlet portion of the filling port 18 connected to the fuel tank 10 via the filling line 16. The motor-driven door 26 may be opened by a motor 27 under the control of the controller 24 when the fuel tank pressure is decreased to a level below the filling pressure of the filling gun.

The motor-driven door 26 may be maintained in a closed state when LPG fuel filling is impossible (e.g., when the LPG fuel tank pressure of the vehicle increases above the LPG filling pressure of the filling gun due to an excessive increase in ambient temperature, for example, in summer). In particular, the driver may recognize the filling impossible state. On the other hand, when a filling possible state is achieved as the fuel tank pressure is decreased to a level below the filling pressure of the filling gun, the motor-driven door 26 may be opened by the controller 24 thus allowing the driver to recognize the filling possible state.

Furthermore, a warning text or message providing a notification regarding a standby state of fuel filling may be displayed through a cluster (not shown) disposed in front of the driver's seat until the fuel tank pressure is decreased from a level that corresponds to the LPG fuel filling impossible state to a level that corresponds to the LPG fuel filling possible state. Accordingly, the driver may more clearly recognize possibility or impossibility of LPG fuel filling.

In addition, a door opening sensor 28 may be mounted to the inlet portion of the filling port 18, to sense an opened state of the motor-driven door 26. The door opening sensor 28 may be configured to determine whether the motor-driven door 26 is in an opened state and whether a failure of the motor-driven door 26 has occurred. In other words, when the door opening sensor 28 is not capable of sensing an opened state of the motor-driven door 26 under the condition that opening of the motor-driven door 26 is operated by the controller 24, the controller 24 may be configured to determine failure of the motor-driven door 26, and display a warning text or the like through the cluster. Accordingly, the driver may recognize failure of the motor-driven door 26.

Hereinafter, a fuel filling method for the bi-fuel vehicle having the above-described configuration according to an exemplary embodiment of the present invention will be described with reference to FIGS. 2 and 3. First, a filling switch for LPG fuel filling may be manipulated by a user or driver (S101). Upon operating the filling switch, a controller may be configured to determine whether the engine is in an ON state or in an OFF state (S102). When the engine is not in an OFF state, a warning text of stopping the engine may be displayed through the cluster (S103). Further, when the engine is in an OFF state, a pressure of the fuel tank that stores LPG fuel may be sensed.

In particular, the sensing of a pressure of the fuel tank may be executed by the pressure sensor 15 mounted within the regulator 14 for regulation of a fuel supply pressure. In other words, the pressure sensor 15 may be configured to sense an internal pressure of the fuel tank as a pressure of the LPG fuel supplied from the fuel tank 10 to the regulator 14 under the condition that the inlet of the regulator 14 communicates with the interior of the fuel tank 10. Thereafter, the controller 24 may be configured to receive the fuel tank pressure sensed by the pressure sensor 15, and compare the received fuel tank pressure with a reference pressure (e.g., a filling pressure of a filling device or filling gun provided in an LPG filling station, for example, about 10 bar) (S104).

In response to determining, based on the compared results, that the fuel tank pressure is equal to or greater than the filling pressure of the filling gun, the solenoid valve 20 may be opened based on a control command from the controller 24 (S105). As the solenoid valve 20 is opened, the LPG fuel in the fuel tank 10 may be introduced into the upper expansion space 44 of the gasoline fuel tank 40 via the venting line 22 and check valve 42 (S106). The introduced LPG fuel may be collected in the canister 46, and then may be introduced into the engine combustion chamber via the purge valve mounted to the suction manifold. The LPG fuel supplied to the engine combustion chamber may be combusted in accordance with startup of the engine and, as such, may be consumed (S107).

As a portion of the LPG fuel in the fuel tank is supplied to the engine, and is then combusted, it may be possible to decrease the internal pressure of the fuel tank to a level equal to or less than the filling pressure of the filling gun (e.g., about 8 bar or less). Particularly, startup of the engine may be temporarily executed to decrease the internal pressure of the fuel tank and, as such, there is no problem of possibility of fire or excessive consumption of LPG. Thereafter, the controller may be configured to determine whether the internal pressure of the fuel tank is decreased to a level below the filling pressure of the filling gun (S108). When the internal pressure of the fuel tank is less than the filling pressure of the filling gun, the motor-driven door 26 of the filling port 18 may be opened by the controller 24 (S109). In this state, it may be possible to achieve smoother filling of the fuel tank with the LPG fuel through insertion of the filling device into the filling port 18.

Furthermore, the controller may be configured to provide a warning regarding fuel filling standby until the internal pressure of the fuel tank is decreased to a level below the filling pressure of the filling gun. In other words, a warning text that provides a notification regarding fuel injection standby may be displayed through a cluster (not shown) disposed in front of the driver's seat until the internal pressure of the fuel tank is decreased to a level below the filling pressure of the filling gun, that is, the fuel tank reaches a filling possible state. Accordingly, the driver may more clearly recognize whether LPG fuel filling is possible.

Additionally, an opened state of the motor-driven door 26 may be sensed by the door opening sensor 28 mounted to the filling port 18, to determine whether a failure of the motor-driven door 26 has occurred. For example, when the door opening sensor 28 is not capable of sensing an opened state of the motor-driven door 26 under the condition that opening of the motor-driven door 26 is operated by the controller 24, the controller 24 may be configured to determine a failure of the motor-driven door 26, and then may be configured to display a warning text or the like through the cluster. Accordingly, the driver may recognize failure of the motor-driven door 26.

As apparent from the above description, when the LPG fuel tank pressure of the vehicle is equal to or greater than the LPG filling pressure of the filling gun due to an excessive increase in ambient temperature, for example, in summer, a portion of the LPG fuel in the fuel tank may be guided to the upper expansion space of the gasoline tank, and may be combusted in the engine after being collected by the canister. Accordingly, it may be possible to decrease the fuel tank pressure below the filling pressure of the filling gun and, as such, filling of the fuel tank with the LPG fuel using the filling gun may be achieved more smoothly. Thus, it may be possible to solve a problem encountered in conventional cases, namely, impossibility of LPG fuel filling occurring when the LPG fuel tank pressure is equal to or greater than the LPG filling pressure of the filling gun due to an excessive increase in ambient temperature occurring in summer.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A fuel filling apparatus for a bi-fuel vehicle, comprising:
   a solenoid valve mounted to a liquefied petroleum gas (LPG) fuel tank in the bi-fuel vehicle;
   a venting line connected to an outlet of the solenoid valve;
   a pressure sensor configured to sense a pressure of the liquefied petroleum gas (LPG) fuel tank;
   a controller configured to operate the solenoid valve to be temporarily opened to discharge a portion of LPG fuel in the liquefied petroleum gas (LPG) fuel tank when the pressure of the liquefied petroleum gas (LPG) fuel tank sensed by the pressure sensor is equal to or greater than a filling pressure of a filling gun; and
   a collector connected to a trailing end of the venting line, to collect the portion of the LPG fuel discharged through the solenoid valve, and to supply the collected LPG fuel to an engine, for temporary startup of the engine,
   wherein the collector includes:
      a check valve mounted to a gasoline fuel tank while being connected to the trailing end of the venting line;
      a canister configured to collect LPG fuel introduced into an upper expansion space of the gasoline fuel tank after passing through the check valve, and then configured to supply the collected LPG fuel to the engine; and
      a purge valve mounted to a suction manifold, to guide the LPG fuel supplied from the canister to a combustion chamber of the engine, and
   wherein the venting line is connected between the outlet of the solenoid valve and the check valve mounted to the gasoline fuel tank, the venting line being configured to guide the portion of the LPG fuel from the liquefied petroleum gas (LPG) fuel tank to be discharged to the gasoline fuel tank when the solenoid valve is opened.

2. The fuel filling apparatus according to claim 1, further comprising:
   a motor-driven door mounted to an inlet portion of a filling port connected to the liquefied petroleum gas (LPG) fuel tank via a filling line, the motor-driven door being opened by the controller when the pressure of the liquefied petroleum gas (LPG) fuel tank is decreased to a level below the filling pressure of the filling gun.

3. The fuel filling apparatus according to claim 2, further comprising:
   a door opening sensor mounted to the inlet portion of the filling port connected to the liquefied petroleum gas (LPG) fuel tank via the filling line and configured to sense an opened state of the motor-driven door.

4. The fuel filling apparatus according to claim 1, wherein the pressure sensor is mounted to a regulator configured to regulate the pressure of fuel supplied from the liquefied petroleum gas (LPG) fuel tank to the engine.

5. The fuel filling apparatus according to claim 1, further comprising:

a cluster configured to output a warning regarding standby of fuel filling until the pressure of the liquefied petroleum gas (LPG) fuel tank is decreased to a level below the filling pressure of the filling gun.

6. A fuel filling method for a bi-fuel vehicle, comprising:
sensing, by a sensor, a pressure of a liquefied petroleum gas (LPG) fuel tank storing liquefied petroleum gas (LPG) fuel;
collecting, by a canister, a portion of the LPG fuel in the fuel tank when the pressure of the liquefied petroleum gas (LPG) fuel tank is equal to or greater than a filling pressure of a filling gun;
supplying, by the controller, the collected LPG fuel to an engine, and combusting the supplied LPG fuel based on startup of the engine, to regulate the pressure of the liquefied petroleum gas (LPG) to be decreased to a level below the filling pressure of the filling gun; and
operating, by the controller, a motor-driven door of a filling port to be opened for LPG fuel filling of the liquefied petroleum gas (LPG) fuel tank when the pressure of the liquefied petroleum gas (LPG) fuel tank is decreased to a level below the filling pressure of the filling gun,
wherein the collecting of the portion of the LPG fuel includes:
guiding a portion of the LPG fuel in the liquefied petroleum gas (LPG) fuel tank to an upper expansion space of a gasoline fuel tank via a venting line connected between an outlet of a solenoid valve and a check valve mounted to the gasoline fuel tank; and
collecting, in the canister, the LPG fuel present in the upper expansion space of the gasoline fuel tank, for supply of the collected LPG fuel to a combustion chamber of the engine, and
wherein the venting line is configured to guide the portion of the LPG fuel from the liquefied petroleum gas (LPG) fuel tank to be discharged to the gasoline fuel tank when the solenoid valve is opened.

7. The fuel filling method according to claim 6, further comprising:
sensing, by the sensor, an opened state of the motor-driven door to determine a failure of the motor-driven door, wherein the sensor is mounted to the filling port.

8. The fuel filling method according to claim 6, further comprising:
displaying on a cluster, by the controller, a warning regarding standby of fuel filling until the pressure of the liquefied petroleum gas (LPG) fuel tank is decreased to a level below the filling pressure of the filling gun.

* * * * *